United States Patent [19]

Sengoku

[11] Patent Number: 4,879,967
[45] Date of Patent: Nov. 14, 1989

[54] SEPARATOR MANUFACTURING APPARATUS FOR FORMING A SEPARATOR PLATE HAVING RIBS OF RESINOUS MATERIAL ON A BASE SHEET

[75] Inventor: Yukinori Sengoku, Nakatsugawa, Japan

[73] Assignee: Mitsubishi Denki Kabushiki Kaisha, Tokyo, Japan

[21] Appl. No.: 251,463

[22] Filed: Sep. 30, 1988

[30] Foreign Application Priority Data

Oct. 1, 1987 [JP] Japan .................. 62-248412

[51] Int. Cl.$^4$ ............................................. B05C 1/08
[52] U.S. Cl. .................... 118/259; 118/203; 118/211; 118/683; 424/115; 424/112; 424/113; 424/101; 156/231; 156/238; 156/578; 156/540
[58] Field of Search ................. 118/259, 203, 40, 673, 118/683, 211; 427/398.2, 444; 156/231, 238, 578, 540; 425/112, 113, 115, 101

[56] References Cited

U.S. PATENT DOCUMENTS

| | | | |
|---|---|---|---|
| 2,624,068 | 1/1953 | Dobry | 425/93 X |
| 3,524,781 | 8/1970 | Winteroth et al. | 156/231 |
| 3,765,809 | 10/1973 | Farrel | 425/92 X |
| 3,811,983 | 5/1974 | Rowland | 156/231 X |
| 4,055,688 | 10/1977 | Caratsch | 118/211 X |
| 4,524,943 | 6/1985 | Busch et al. | 425/554 X |
| 4,655,166 | 4/1987 | Nishimura et al. | 118/673 |
| 4,759,703 | 7/1988 | Krebser et al. | 425/90 |

FOREIGN PATENT DOCUMENTS 54-72437 6/1979 Japan .

Primary Examiner—Shrive Beck
Assistant Examiner—Alain Bashore
Attorney, Agent, or Firm—Oblon, Spivak, McClelland, Maier & Neustadt

[57] ABSTRACT

A separator manufacturing apparatus comprises a transfer roller with a plurality of annular shaping grooves having a predetermined shape in cross section which are formed in the outer circumferential surface of the roller in its circumferential direction, a resin feeding device with a nozzle means to feed a hot-melt type resin having highly adhesive properties to the annular shaping grooves of the transfer roller, a base paper feeding device to feed a continuous paper at a predetermined speed to a part of the outer circumferential surface of the transfer roller at the same time of feeding the resin to thereby form by transfer a plurality of ribs having a predetermined shape corresponding to the annular shaping groove on a surface of the continuous paper, and a parting agent coating device for applying before the feeding of the resin a thin layer of parting agent to at least portion of the annular shaping grooves on the transfer roller.

7 Claims, 4 Drawing Sheets

SEPARATOR MANUFACTURING APPARATUS FOR FORMING A SEPARATOR PLATE HAVING RIBS OF RESINOUS MATERIAL ON A BASE SHEET

BACKGROUND OF THE INVENTION

1. Field of the Invention

The present invention relates to a separator manufacturing apparatus to manufacture a separating plate having a spacing structure which is used as a structural element for a corrugated board, a battery having a laminated structure, a heat exchanger having a laminated structure and so on. Particularly, the present invention relates to such apparatus to manufacture a separator in which the spacing structure is formed by a resinous material.

2. Discussion of Background

Generally, the structure of a separator, even though some differences are found depending on articles in which a separator is used, is such that ribs or projecting strips made of a resinous material are formed in a comblike shape on a surface of a flat material such as a film or a sheet to thereby form a space in an article.

The separator has been manufactured by a conventional apparatus or method as disclosed in Japanese Unexamined Patent Publication No. 205966/1982 or Japanese Unexamined Patent Publication No. 72437/1979. Namely, the separator has been manufactured by heat-bonding mono-filaments of resin, which constitute ribs, on a flat plate material by a heat sealer, or by applying in a linear form a highly viscous resin having adhesion properties on a flat plate material, followed by curing it. Since the later method is more advantageous than the former from the standpoint of capability of adopting a continuous process, an apparatus as shown in FIG. 5 is practiced to conduct the later method. Namely, a highly viscous molten resin with adhesion properties is forcibly injected through a plurality of gun nozzles 28 which are arranged in alignment, while a flat plate material 29 is moved in the direction perpendicular to the linearly arranged gun nozzles 28, whereby a plurality of streams of resin are caused to flow on the flat plate material 28, then, the resin is cured. Thus, the same number of ribs as the gun nozzles 28 can be continuously formed at once on the flat plate material 29.

In the method and apparatus as disclosed in Japanese Unexamined Patent Publication No. 205966/1982, it was difficult to continuously form such ribs. According to the conventional technique as shown in FIG. 5, it was possible to continuously form the ribs 30 having a predetermined shape to some extent. However, the technique as in FIG. 5 had such disadvantage that when an amount of a resin discharged through the gun nozzles 28 was slightly changed, there caused a change in cross section of the ribs 30, whereby it is difficult to form the ribs 30 having a constant shape and dimensions. The ribs 30 formed on the flat plate material assume a shape of arch in cross section because the shape of the ribs 30 depends on the surface tension of the resin. Accordingly, it is difficult to obtain a desired height in the ribs 30 even though an amount of the resin discharged through the gun nozzles 28 is increased (because the viscosity of the resin can not be increased without any limitation). Further, vibrations in the apparatus and influence of an air stream may form zig-zag ribs 30 and an accurate pitch between the ribs 30 formed on the flat material can not be obtained.

SUMMARY OF THE INVENTION

It is an object of the present invention to provide a separator manufacturing apparatus capable of continuously producing a separator of high quality at a high speed while ribs of resin having a stable shape and dimensions can be obtained and determination of the shape of the ribs can be flexible.

The foregoing and the other objects of the present invention have been attained by providing a separator manufacturing apparatus which comprises:

a transfer roller with a plurality of annular shaping grooves having a predetermined shape in cross section which are formed in the outer circumferential surface of the roller in its circumferential direction, a resin feeding device with a nozzle means to feed a hot-melt type resin having highly adhesive properties to the annular shaping grooves of the transfer roller, a base paper feeding device to feed a continuous paper at a predetermined speed to a part of the outer circumferential surface of the transfer roller at the same time of feeding the resin to thereby form by transfer a plurality of ribs having a predetermined shape corresponding to the annular shaping groove on a surface of the continuous paper, and a parting agent coating device for applying before the feeding of the resin a thin layer of parting agent to at least portion of the annular shaping grooves on the transfer roller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
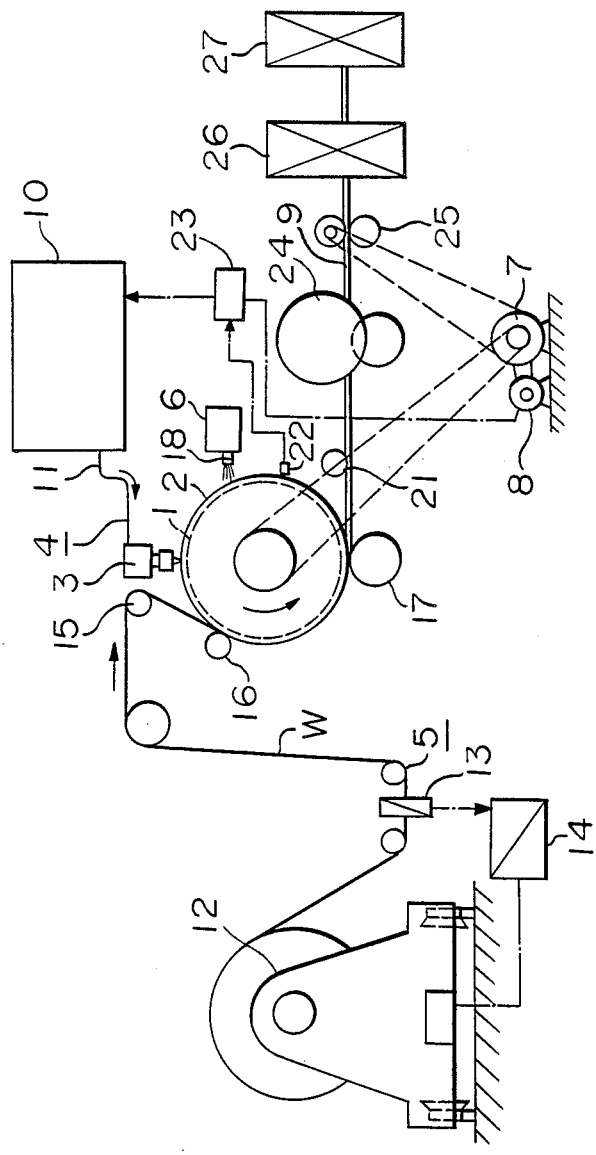
FIG. 1 is a systematic diagram showing an embodiment of the separator manufacturing apparatus according to the present invention.
Figure 2:
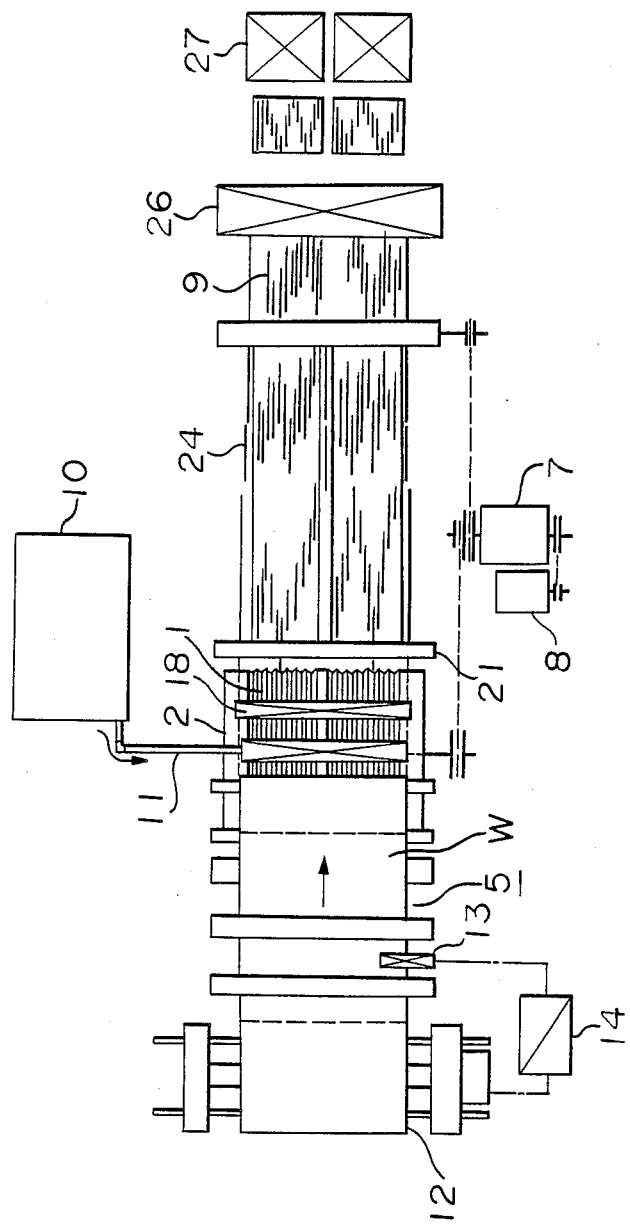
FIG. 2 is a plane view of the separator manufacturing apparatus of the present invention.

Referring to the drawings, wherein the same reference numerals designate the same or corresponding parts throughout several views, and more particularly to FIGS. 1 to 4, there is shown an embodiment of the separator manufacturing apparatus of the present invention.

The conventional separator manufacturing apparatus adopts a flowing-down system wherein ribs of resin are formed by heat bonding or flowing a resinous material. In the present invention, the ribs of resin are formed on a base paper by transferring. Thus, the present invention adopts a transferring system. With respect to the base paper, it is possible to use a thin flat material having lower rigidity other than paper.

Figure 3:
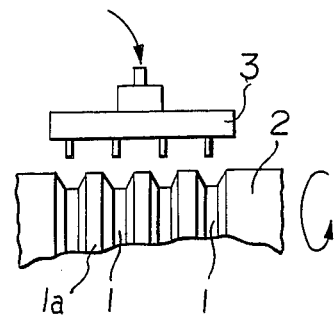
FIG. 3 is an enlarged view partly broken of a transfer roller and gun nozzles used for the separator manufacturing apparatus of the present invention.
Figure 4:
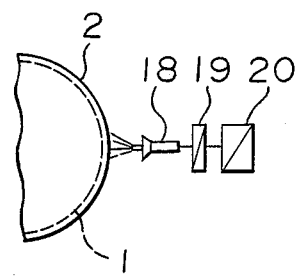
FIG. 4 is a diagram showing a transfer roller and a parting agent coating device used for the separator manufacturing apparatus of the present invention.
Figure 5:
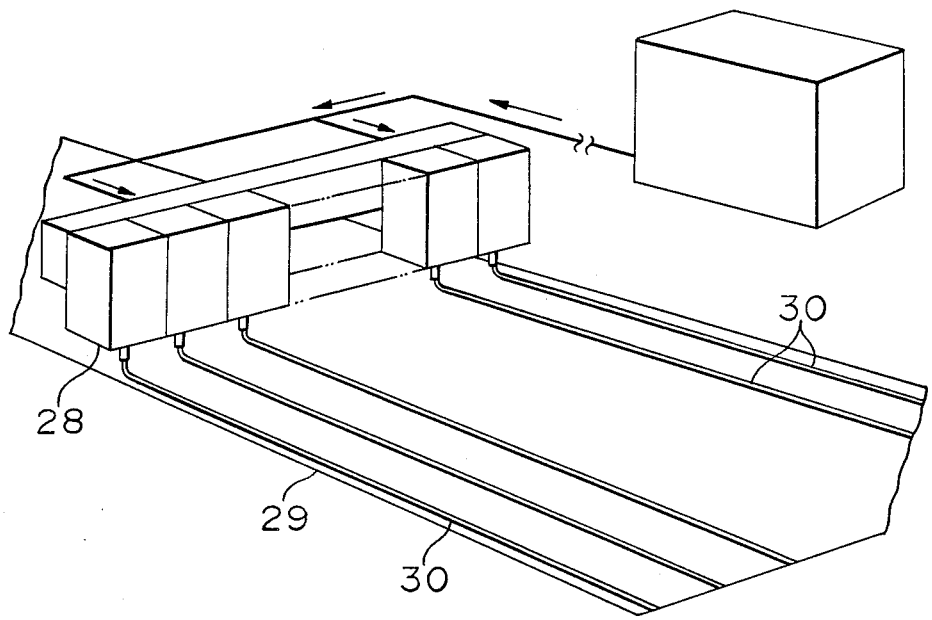
FIG. 5 is a perspective view partly omitted of a conventional separator manufacturing apparatus.

In FIGS. 1 and 3, a separator manufacturing apparatus comprises a transfer roller 2 having an outer circumferential surface in which a plurality of annular shaping grooves 1 having a predetermined shape in cross section are formed in its circumferential direction and are separated by lands 1a, a resin feeding device 4 adapted to feed a hot melt type molten resin to the annular shaping grooves 1 of the transfer roller 2 through a plurality of gun nozzles 3, a base paper feeding device 5 to feed a base paper W at a predetermined speed to the outer circumferential surface of the transfer roller 2 and a parting agent coating device 6 to coat a thin layer of parting agent to the transfer roller 2 before feeding the resin.

The transfer roller 2 is horizontally supported and is rotated in one direction at a low speed by means of a motor 8 through a reduction gear 7. The transfer roller 2 is provided with a plurality of annular shaping grooves 1 in the circumferential surface with a predetermined distance between the adjacent grooves. Each of the grooves has a shape and dimensions in cross section which correspond to the shape and dimensions of ribs of resin 9 to be formed. Namely, it is possible to form a desired shape other than an arch-shape by the conventional flowing-down method. It is possible to select the shape of grooves which are suitable for forming the ribs without causing burrs unless the size of the bottom of the grooves is greater than that of the opening of the grooves. A cooling device may be provided in or near the body of the transfer roller 2 to cure the molten resin at a short time.

The resin feeding device 4 comprises a hot melt applicator 10, a hose and a plurality of gun nozzles 3. The hot melt applicator 10 includes a gear pump in its resin melting chamber so that molten resin is forcibly supplied to the gun nozzles 3 through the hose 11. The gear pump performs a pumping function to the molten resin in proportion to a rotational speed of the transfer roller 3 by means of a rotation control device (SCR). The gun nozzles 3 connected to the hot melt applicator 10 through the hose 11 are placed at a machine frame which supports the rotary shaft of the transfer roller 2 so that each of the gun nozzles 3 corresponds to each of the annular shaping grooves 1 and the molten resin forcibly supplied through the hose 11 is ejected to the shaping grooves 1 at positions close to the grooves. The resin in the hot melt applicator 1 may be a hot melt type resin having adhesion properties such as ethylene-vinyle acetate, APP (a reproduced product of the by-product produced when polypropylene is produced) and so on, and it is heated at a temperature of 120° C.–180° C. in the hot melt applicator 10.

The base paper feeding device 5 is generally constituted by a paper feeding part, a transferring part including the transfer roller 2 and a paper driving part which follows the transfer roller 2. The rewinding reel 12 is moved in the direction perpendicular to the direction of forwarding the base paper W by means of a controller 14 which is actuated by a signal from a displacement detecting device 13 so that the base paper W is forwarded while keeping a correct position. The controller 14 generates a stop signal so as to prevent the base paper W from over-feeding due to a force of inertia.

The displacement detecting device 13 is provided with an air sensitive device, a photo-sensitive device and so on to detect displacement of the base paper W in its width direction, whereby the rewinding reel 12 is actuated by the controller 14.

A guide roller 15 is provided at the final stage of the paper feeding part, i.e. at a position above the transfer roller 2 and in front of the gun nozzles 3 with respect to the direction of rotation of the transfer roller 2 (in the counter clockwise direction 2 in FIG. 1). The axial centerline of the guide roller 15 is in parallel to the axial centerline of the transfer roller 2 so that it is movable toward and away from the transfer roller 2 in association with a press roller 16. An additional press roller 17 is provided below the transfer roller 2 so that it is pressed to the outer circumferential surface which constitutes a transferring part. The first press roller 11 is provided at an intermediate position between the gun nozzles 3 and the second press roller 17 on the outer circumferential surface of the transfer roller 2. A stretching force is given to the base paper W by the guide roller 16 and the second press roller 17 in association with the transfer roller 2 so that the base paper W can be in close contact with the outer circumferential surface of the transfer roller 2 in a range of half in the entire length of the outer circumference of the transfer roller 2. The first press roller 16 assures the optimum timing of contact of the base paper W to the transfer roller 2 because the rotation speed of the transfer roller is balanced to a curing speed of the molten resin. The second press roller 17 clamps the base paper W by the aid of the transfer roller 2 to thereby transmit a rotational force of transfer roller 2 to the base paper W, whereby the base paper W is pulled in the forwarding direction.

The parting agent coating device 6 is provided in front of the gun nozzles 3 with respect to the direction of rotation of the transfer roller 2, and is provided with at least one spray gun 18 directed to the shaping grooves 11 of the transfer roller 2, a controller 19 to control an amount of parting agent to be fed to the spray gun 18 and a container 20 containing the parting agent. The parting agent coating device 6 is adapted to coat a thin layer of parting agent to at least a portion of shaping grooves 1 of the transfer roller 2 before the molten resin is supplied to the grooves. The parting agent includes silicon resin, fluorine resin and so on as a binder. When a parting agent which rapidly looses its parting function after transferring operations is used, the parting agent can be continuously coated on the transfer roller 2 by means of the spray gun 18 which is controlled by the controller 19. On the other hand, when a parting agent having a relatively long parting effect is used, the parting agent may be intermittently applied to the transfer roller 2 by the spray gun 18 which is controlled by the controller 19.

The paper driving part comprises a separating roller 21 disposed above and behind the second press roller 17. The separating roller 21 functions to press the base paper W which tends to wrap on the transfer roller 2 along with the revolution the roller 2 at the rear part of the downstream side of the outer circumference of the roller 2 to thereby smoothly separate the base plate on which ribs 9 are transferred, from the transfer roller 2 and to drive the base paper W smoothly.

A failure detecting device 22 is disposed in the vicinity of the outer circumferential surface of the transfer roller 2 and at a position between the second press roller 17 and the parting agent coating device 6. The failure detecting device 22 detects some amount of resin remaining in the shaping grooves of the transfer roller 2 because of failure of separating the resin by the separating roller 21, and generates a signal to stop the operation of the rein feeding device 4 and at the same time, to stop the forwarding operation for the base paper W through the controller 22.

In FIG. 1, a reference numeral 24 designates a slitter which aligns the width of the base paper W on which the ribs 9 are transferred and cuts the paper W to give a predetermined width, a numeral 25 designates an auxiliary driving roller which separates the base paper W from the transfer roller 2 smoothly, cooperates with the slitter 24 to cut the base paper smoothly and drives the paper W to the next step, the circumferential speed of the auxiliary driving roller being the same as the transfer roller 2, a numeral 26 designates a cutting device and a numeral 27 is a piling device.

The base paper W held by the rewinding reel 22 is pulled in accordance with the rotation of the transfer roller 2 and becomes in close contact with the transferring part of the transfer roller 2 so that it wraps the transfer roller 2 in a state without loosening. A constant amount of molten resin fed from the resin feeding device 4 is continuously supplied to each of the shaping grooves to fill the grooves with the molten resin. The base paper W is continuously brought into contact with the outer circumferential surface of the transfer roller 2 in which the shaping grooves 1 are filled with the molten resin, whereby ribs of resin are continuously formed by transfer on the base paper W. The molten resin filled in the shaping grooves 1 is gradually cooled by the cooling function of the transfer roller 2, and then cured while the resin is transferred onto the base paper W; thus, the transferred resin is fixedly attached on the base paper W to form the ribs of resin 9 having a predetermined shape in cross section corresponding to the shaping groove 1. The base paper W with the ribs of resin 9 fixedly attached thereto constitutes substantially a separator, and is driven while it is separated from the transfer roller 2 by means of the separating roller 21 and the auxiliary driving roller 25.

The transfer type separator manufacturing apparatus of the present invention has various features as follows. The shape in cross section of the rib 9 can be determined with flexibility. The height of the rib 9 can be determined by the shaping groove 1 regardless of the viscosity of resin to be used. There is no outer disturbance such as influence of an air stream, vibrations in the apparatus since molten resin is held in the shaping grooves 1 so that a separator having high accuracy and high quality can be continuously obtained with a small amount of resin. When a separating function for the resin from the transfer roller 2 becomes poor, the separating function can be easily restored by applying a parting agent.

Thus, in accordance with the present invention, a molten resin is filled in a plurality of annular shaping grooves having a predetermined shape in cross section which are formed in the outer circumferential surface of the transfer roller in its circumferential direction; a base paper is forwarded at a predetermined speed by a base paper feeding device onto the outer circumferential surface of the transfer roller; and a plurality of ribs of resin having the shape and dimensions corresponding to the annular shaping grooves are continuously formed by transfer on a surface of the base paper. Further, a thin layer of parting agent may be applied to the shaping grooves of the transfer roller before feeding the resin. Accordingly, the resin can be smoothly separated from the shaping grooves, whereby the transfer roller can be kept in a clean state and it is easy to clean the roller, and a separator having high quality can be manufactured.

Obviously, numerous modifications and variations of the present invention are possible in light of the above teachings. It is therefore to be understood that within the scope of the appended claims, the invention may be practiced otherwise than as specifically described herein.

What is claimed is:

1. A separator manufacturing apparatus for forming a separator plate having ribs of resinous material on a base sheet, which comprises:
   a transfer roller with a plurality of annular shaping grooves having a predetermined shape corresponding in cross section to the ribs, said ribs being formed in the outer circumferential surface of said roller and extending in its circumferential direction,
   a resin feeding device with a nozzle means having a plurality of nozzles positioned to separately feed a hot-melt type resin having highly adhesive properties to each of said annular shaping grooves of the transfer roller,
   a base paper feeding device to feed a continuous base paper at a predetermined speed to a part of said outer circumferential surface of the transfer roller at the time of feeding said resin to thereby form by transfer a plurality of said ribs having a predetermined shape corresponding to the annular shaping groove on a surface of said continuous base paper, and
   a parting agent coating device for applying before the feeding of said resin a thin layer of parting agent to at least a portion of said annular shaping grooves on said transfer roller.

2. The separator manufacturing apparatus according to claim 1, wherein said parting agent coating device is to continuously apply the thin layer of parting agent.

3. The separator manufacturing apparatus according to claim 1, wherein said transfer roller is rotatably supported with its axis of rotation being in horizontal, and said resin feeding device is provided with nozzle apertures corresponding in number to said annular shaping grooves so that molten resin is forcibly supplied on the upper part of said outer circumferential surface of the transfer roller.

4. The separator manufacturing apparatus according to claim 1, wherein said resin feeding device comprises a hot-melt applicator including therein a gear pump and a rotation control means, whereby molten resin is forcibly fed by a pumping effect.

5. The separator manufacturing apparatus according to claim 1, wherein said parting agent coating device comprises a spray gun directed to said annular shaping grooves of the transfer roller to form a thin layer of parting agent on said grooves.

6. The separator manufacturing apparatus according to claim 1, wherein said parting agent includes a silicon resin or a fluorine resin as a binder.

7. The separator manufacturing apparatus according to claim 1, wherein said transfer roller includes lands separating said annular shaping grooves.

* * * * *